May 3, 1932.  A. B. MODINE  1,856,924
AIR HEATING UNIT
Filed Aug. 7, 1929  3 Sheets-Sheet 1

Witness:
William P. Kilroy

Inventor:
Arthur B. Modine
By Hill & Hill
Attys

May 3, 1932.  A. B. MODINE  1,856,924
AIR HEATING UNIT
Filed Aug. 7, 1929   3 Sheets-Sheet 2
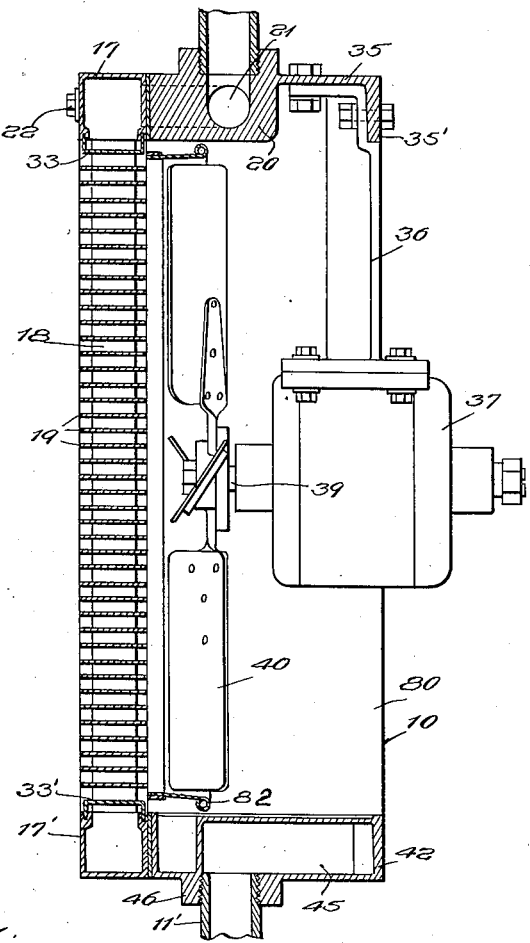
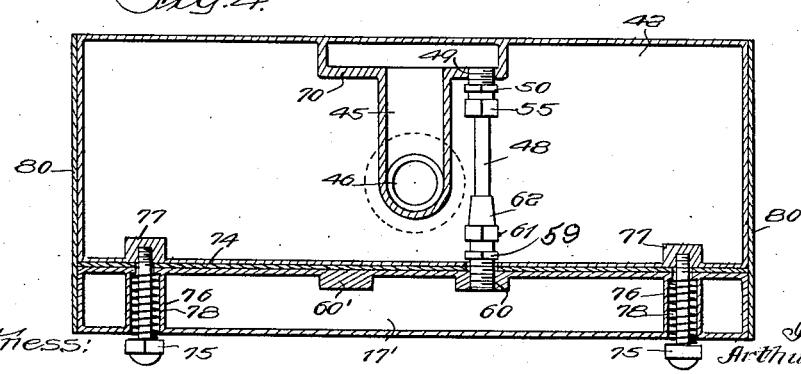
Inventor:
Arthur B. Modine May 3, 1932.  A. B. MODINE  1,856,924
AIR HEATING UNIT
Filed Aug. 7, 1929   3 Sheets-Sheet 3

Witness:
William P. Kilroy

Inventor:
Arthur B. Modine
By Hill & Hill
Attys

Patented May 3, 1932

1,856,924

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

AIR HEATING UNIT

Application filed August 7, 1929. Serial No. 384,204.

My invention relates generally to heat exchange devices and while suitable for other heating or cooling systems, has to do more particularly with apparatus of the type referred to which is particularly adapted for heating a factory or other enclosure used for industrial purposes.

An object of my invention is to provide a heating unit which will be adapted to project a current of heated air into an enclosure and is so designed as to permit thermal expansion and contraction of the heating elements without danger of injury to the device, and consequent leakage of heating fluid.

Another object is to provide a device of the class described which is adapted to be adjustably mounted so that the heated air may be projected in any desired direction.

A still further object is to provide means for coupling tubular members in a heating unit so as to permit flexing of these members while retaining fluid-tight connections, such coupling being accomplished without the use of solder or the like.

Still another object is to provide a device of the type referred to which will be particularly simple and compact in construction, inexpensive to manufacture, easy to assemble and demount, and unusually rugged.

Various other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

Referring now to the drawings forming a part of this specification and illustrating a preferred embodiment of the invention:

Fig. 3 is a sectional view taken on the line 3—3 of Fig. 1;

Fig. 4 is a sectional view taken on the line 4—4 of Fig. 1;

Fig. 5 is a sectional view taken on the line 5—5 of Fig. 1; and

Fig. 6 is a sectional view taken on the line 6—6 of Fig. 1.

Figure 1:
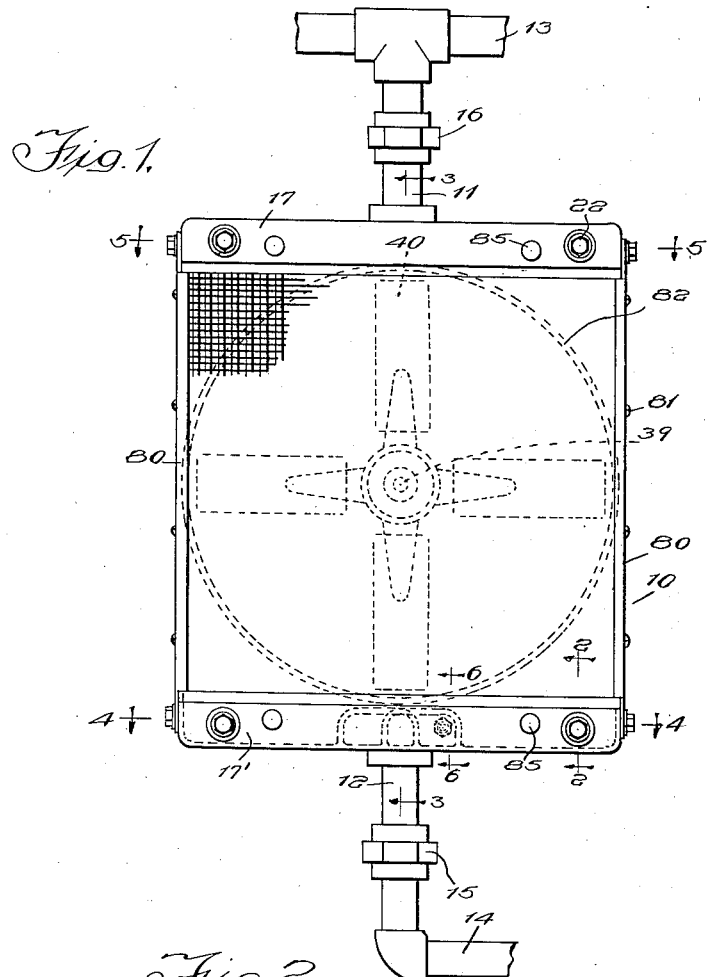
Fig. 1 is a front elevational view of a device embodying my invention.
Figure 2:
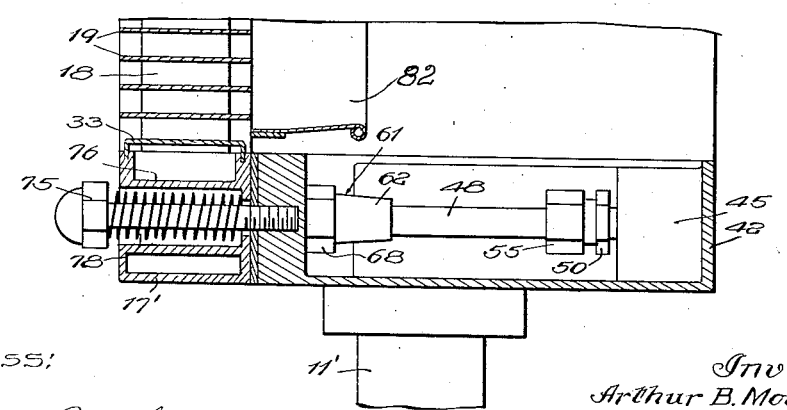
Fig. 2 is a sectional view taken on the line 2—2 of Fig. 1.

In the preferred embodiment shown in the drawings, the numeral 10 indicates generally a heating unit adapted to be mounted in any convenient manner. In the particular embodiment disclosed, the heating unit 10 is supported by connections with the piping of the heating system preferably at the top and bottom by means of nipples 11 and 12 which are in turn, respectively connected with the piping 13 and 14 of the heating system, this connection being formed through the agency of unions respectively designated 15 and 16, which allow the unit to be rotated upon a vertical axis. The piping 16 is connected with a suitable source (not shown) of heating fluid such as steam, hot water or the like, it being understood that the pipe or conduit 14 serves as a drain for the exhausted heating fluid. Obviously, various other types of connections for the mounting and other arrangements of the parts will readily suggest themselves to those familiar with the art, and hence I do not wish to be limited to the particular arrangement shown and described.

The heat exchange means comprises broadly an upper tank 17 and a lower tank 17' communicating with each other by means of spaced tubular members 18 having vanes or fins 19 arranged transversely thereof. These tubes 18 and vanes 19 are formed of any suitable material having a high heat conductivity and are preferably of thin sheet metal.

The upper tank such as 17 is connected for support with a frame member 20 and is served with heating fluid through a passage 21 formed in the supporting frame; this passage is connected with the fluid inlet from the system by means of the pipe connections including the nipple 11. This frame 20 provides means for supporting another element of the structure such as a fan and motor for driving the fan; the passage 21 formed in the frame is preferably U-shaped as best shown in Fig. 5.

The tank 17 is secured to the frame member 20 by means of bolts 22, which are threaded into bosses 23 formed upon the frame member 20, the bolts 22 being passed through sleeves 24 formed in the tank 17, (Fig. 5), and thus provides means for holding the tank against a gasket 25 arranged between the tank and frame member. The tank 17 is open at one side, and is closed by a header 33 which has its longitudinal edges inserted in grooves provided in the side walls of the tank 17 and one end of the tubes 18 are arranged in said header, they being secured to the header by solder or other suitable means. The construction of the lower tank 17' is substantially similar in this respect to the upper tank 17, it being closed by means of a header 33', having apertures for the reception of the opposite ends of the tubes 18.

The frame member 20 is provided with the laterally and downwardly extending portions 35—35' which provide a bracket (Fig. 3) to which a support 36 is connected to provide a support for the motor 37. This motor may be of any suitable design, preferably electrical, and has a fan 40 attached to the shaft 39 thereof. The header 17' is connected for support to a member 42 which has a tubular conduit 45 formed integrally therewith, as shown in Fig. 4; this conduit 45 is preferably T-shaped for a reason which will later become apparent. The conduit 45, the nipple 11', and the piping 14 of the system communicate with each other and the conduit and the lower tank 17', and communication between the conduit 45 and the tank 17' is provided for through means of a flexible metallic tubular member 48. The tubular member 48 has one end connected to the conduit 45 by means of an exteriorly threaded nipple 50 Fig. 6. The nipple 50 has an end constructed to provide means as shown at 53 to engage and compress the ring 54 between the nut 55 and the end 53 of the nipple 50 to form a leak proof solderless joint between these parts which allows for expansion and contraction of the tube 48.

The flexible tubular member 48 is secured at its opposite end to the tank 17', by means of a nipple 58 having a tool engaging polygonal portion 59, the nipple being threaded into an aperture 60 provided in the tank 17' and having its opposite end screw threaded with a coupling member 61 having a conical portion 62. As best seen in Fig. 6, the member 61 has an internal annular shoulder 63 for engagement with an outwardly extending flange 65 formed on the end of the flexible tubular member 48. It will be noted that the end of the nipple 58, which cooperates with the flange 65 has a correspondingly shaped end 66 which is adapted to cooperate with the concave face of the flange 65 of the tubular member 48 so as to form a fluid tight joint when the coupling member 61 is screwed up tightly on the nipple. It will be obvious that, inasmuch as the material of the tubular member 48 is flexible, it will tend to spread under pressure, hence, when the coupling member 61 is screwed up so that its shoulder 63 abuts firmly against the flange 65 of the tubular member 48, considerable pressure is applied against the convex face of the nipple, which will tend to seat the material of the flange with great accuracy around the face of the nipple, and thus, insure a perfectly fluid tight connection between these parts. The coupling member is provided with a polygonal portion 68 for engagement by a suitable tool.

The tank 17' is provided with a boss 60' which may be tapped, should it be desired to provide an additional fluid conducting connection between the tank and the conduit 45, in which case the additional fluid connection would be formed by means of an opening produced in a portion 70 of the T-shaped conduit and the provision of a tubular passage such as that including the pipe 48, the latter of which would be connected with said opening. To this end the conduit 45 is T-shaped.

The front wall of the casing member 42, as shown best in Fig. 6 is provided with an opening 72 to allow a connection to be formed between the tank 17' and the nipple 58, this opening 72 is of a dimension which provides a space between the nipple 58 and the gasket. A gasket 74 of any suitable material, is interposed between the front wall of the casing 42 and the adjacent wall of the tank 17', similar in construction and function with the gasket 25 of the tank 17. The tank 17' is provided with tubular bolt receiving passages 76 formed in the tank 17'; bolts 75 are arranged in these passages and connect the tank 17' with the element casing 42, the tank 17' being resiliently held relatively to the casing by means of coiled springs arranged upon the bolt to reout between the head of the bolt and said tank 17'. The openings in the tank through which the bolts are passed into engagement with the casing are also somewhat larger than the diameter of the bolts. From this, it can be seen that the tubes 18 are free to expand and contract vertically, thus moving the tank 17' up and down, without danger of injury to any of the parts, the tank 17' being so mounted as to permit such movement while the tank 17 is rigidly mounted. The springs 78 serve to retain the tank 17' in frictional engagement with the casing member 42 so that the tank is given considerable support by this casing member while at the same time being free to move in the manner just described. This relative movement is facilitated by means of the tubular member 48 which forms a connection between the tank 17' and the conduit 45. As above described, while the tubular member 48 is rigidly coupled to the tank by means of the coupling member 62, the flexible member 48 is slidably connected with the conduit 45 by means of the coupling member 55 and nipple 51.

Side plates 80 are secured to the frame member 20 and casing member 42 by any suitable means, such as bolts 81. It will thus be seen that the fan and motor are enclosed in a housing open only at the rear, this housing being formed at the front by the tubes 18 and fins 19, at the top by the frame member 20 and bracket 35, at the bottom by the casing member 42, and by the side plates 80.

An annular flange 82 extends inwardly or toward the fan, surrounds the fan and provides means to conduct a current of air created by the fan between the tubes 18 and fins 19 secured to the tubes.

Bosses 85 are provided on the front of the tanks 17 and 17' respectively, which may be drilled and tapped to receive screws whereby a device may be secured for deflecting up or down the air which is being projected through the heating unit.

From the foregoing description, it is evident that the structure is capable of connection with a pipe 13, the latter of which is connected to any suitable source of heating or cooling fluid (not shown) while the pipe 14 is connected to a drain. The motor 37 is connected to a suitable source of electrical energy (not shown) and when placed in operation will rotate the fan 40 thus forcing a current of air between the tubes 18 and vanes 19. Hence, when used as a heating device a column of heated air will be projected into the room and, inasmuch as the heating unit may be rotated in a horizontal plane about a vertical axis represented by the pipe unions 15 and 16', this column of air may be directed wherever desired. Obviously the device may be used in the same manner for cooling purposes, merely substituting a refrigerant for the heating fluid. If shutters are mounted on the bosses 85 in the manner disclosed in my copending application above referred to, the air may likewise be deflected in a vertical plane. Obviously the cool air will be drawn in from the rear of the housing and hence, the motor will be constantly subjected to relatively cool air and thus protected from injury due to overheating. Furthermore, as disclosed above, the construction herein shown permits thermal expansion and contraction of the heating unit without danger of injury to any of the parts, this being due to the yieldable mounting for the tank 17'.

Having thus described my invention, what I claim as new and desire to secure by Letters Patent is:

1. In a device of the class described, a heating unit comprising an upper tank and a lower tank connected by tubular members, and means for supporting said unit comprising fluid conducting frames, one of said frames being rigidly secured to one of said tanks and the other frame frictionally engaging the other of said tanks and a connection between said last mentioned tank and frame providing for said frictional engagement and linear expansion and contraction of said tubular members relatively to said frame.

2. In a device of the class described, a heating unit comprising an upper tank and a lower tank connected by tubular members and means for supporting said unit comprising fluid conducting frames, a connection between one of said frames and its tank providing means frictionally engaging said frame and providing means for compensating for linear expansion and contraction of said tubular members.

3. In a device of the class described, a heating unit comprising an upper tank and a lower tank connected by tubular members, means for supporting said unit comprising fluid conducting frames, one of said frames being rigidly secured to one of said tanks and the other frame frictionally engaging the other of said tanks so as to permit linear expansion and contraction of said tubular members, and means for providing communication between said last named tank and its tubular frame including a flexible tubular member.

4. In a device of the class described, a heating unit comprising an upper tank and a lower tank connected by tubular members, means for supporting said unit comprising fluid conducting frames, said upper tank being rigidly secured to its frame and said lower tank being frictionally engaged by its frame so as to permit linear expansion and contraction of said tubular members, and means including a flexible tubular member for providing communication between said last named tank and its tubular frame.

5. In a device of the class described, a heating unit comprising an upper tank and a lower tank connected by tubular members, and means for supporting said unit comprising fluid conducting frames, one of said frames being rigidly connected to one of said tanks, means providing communication between the other frame and the other tank including a flexible tubular member, means for coupling the opposite ends of said tubular member respectively with said tank and frame, one end of said tubular member being rigidly coupled and the other end coupled to provide for longitudinal movement of said last mentioned end.

6. In a device of the class described, a heating unit comprising an upper tank and a lower tank connected by tubular members, and means for supporting said unit comprising fluid conducting frames, said upper tank being rigidly secured to its frame and said lower tank being secured by a connection including means frictionally engaged by its frame to provide means compensating for linear expansion and contraction of said tubular members, means providing communication between said last-named frame and said lower tank including a flexible tubular member, connections provided at opposite ends of said tubular member respectively connecting said flexible tubular member with said tank and frame, one of said connections providing means compensating for longitudinal movement of said end of said tubular member.

7. In a device of the class described, a heating unit comprising an upper tank and a lower tank connected by tubular members, and means for supporting said unit comprising fluid conducting frames, said upper tank being rigidly secured to one frame and said lower tank frictionally engaging the other frame so as to permit linear expansion and contraction of said tubular members, and means for resiliently urging said lower tank into engagement with its frame.

8. In a device of the class described, a heating unit comprising an upper tank and a lower tank connected by tubular members, and means for supporting said unit comprising fluid conducting frames, said upper tank being rigidly secured to one frame and said lower tank frictionally engaging the other frame so as to permit linear expansion and contraction of said tubular members, means for resiliently urging said lower tank into engagement with its frame, and means for providing communication between the lower tank and its frame including a flexible tubular member.

9. In a device of the class described, a heating unit comprising an upper tank and a lower tank connected by tubular members, means for supporting said unit comprising fluid conducting frames, one of said frames being rigidly secured to one of said tanks and the other frame frictionally engaging the tank connected therewith providing means compensating for linear expansion and contraction of said tubular members, means supported by one of said frames for projecting a current of air through said heating unit, and walls connecting said frames and cooperating therewith, and with said heating unit to form a housing for said air projecting means.

10. In a device of the class described, a heating unit comprising an upper tank and a lower tank connected by tubular members, means for supporting said unit comprising fluid conducting brackets, said upper tank being rigidly secured to its bracket and said lower tank being frictionally engaged by its bracket and providing means compensating for linear expansion and contraction of said tubular members, means supported by one of said brackets for projecting a current of air through said heating unit, and walls connecting said brackets and cooperating therewith and with said heating unit to form a housing for said air projecting means.

11. In a device of the class described, a heating unit comprising an upper tank and a lower tank connected by tubular members, means for supporting said unit comprising fluid conducting brackets, one of said brackets being rigidly secured to one of said tanks and the other bracket frictionally engaging the other of said tanks so as to permit linear expansion and contraction of said tubular members, means for providing communication between said last-named tank and its tubular bracket including a flexible tubular member, means supported by one of said brackets for projecting a current of air through said heating unit, and walls connecting said brackets and cooperating therewith and with said heating unit to form a housing for said air projecting means.

12. In a device of the class described, a heating unit comprising an upper tank and a lower tank connected by tubular members, means for supporting said unit comprising fluid conducting brackets, said upper tank being rigidly secured to its bracket and said lower tank being frictionally engaged by its bracket so as to permit linear expansion and contraction of said tubular members, means for providing communication between said last-named tank and its tubular bracket including a flexible tubular member, means supported by one of said brackets for projecting a current of air through said heating unit, and walls connecting said brackets, and cooperating therewith and with said heating unit to form a housing for said air projecting means.

13. In a device of the class described, a heating unit comprising an upper tank and a lower tank connected by tubular members, and means for supporting said unit comprising fluid conducting brackets, one of said brackets being rigidly connected to one of said tanks, means providing communication between the other bracket and the other tank including flexible tubular members, means for rigidly coupling one end of said flexible tubular member, means for coupling the other end of said flexible tubular member so as to permit longitudinal movement of said other end, means supported by one of said brackets for projecting a current of air through said heating unit and walls connecting said brackets, and cooperating therewith and with said heating unit to form a housing for said air projecting means.

14. In a device of the class described, a heating unit comprising an upper tank and a lower tank connected by tubular members, and means for supporting said unit comprising fluid conducting brackets, one of said brackets being rigidly connected to one of said tanks, means providing communication between the other bracket and the other tank including a flexible tubular member, means for rigidly coupling one end of said flexible tubular member, means for coupling the other end of said flexible tubular member so as to permit longitudinal movement of said other end, means supported by one of said brackets for projecting a current of air through said heating unit, and walls connecting said brackets, and cooperating therewith and with said heating unit to form a housing for said air projecting means.

15. In a device of the class described, a heating unit comprising an upper tank and a lower tank connected by tubular members, means for supporting said unit comprising fluid conducting brackets, one of said brackets being rigidly secured to one of said tanks and the other bracket frictionally engaging the other of said tanks providing means compensating for linear expansion and contraction of said tubular members, means supported by one of said brackets for projecting a current of air through said heating unit, walls connecting said brackets, and cooperating therewith and with said heating unit to form a housing for said air projecting means, said brackets respectively having openings which align with each other, said device being angularly adjustable about an axis of rotation coincident with that of said openings.

16. In a device of the class described, a heating unit comprising upper and lower tanks connected by tubular members, means for supporting said unit comprising fluid conducting brackets, a connection between one of said tanks and one of said brackets providing means compensating for linear expansion and contraction of said tubular members, said means including means extending through said bracket and providing a fluid connection between said tank and bracket.

17. In a device of the class described, a heating unit comprising upper and lower tanks connected by tubular members, means for supporting said unit comprising fluid conducting brackets, a connection between one of said tanks and one of said brackets providing means compensating for linear expansion and contraction of said tubular members, said means including means providing a fluid connection between said tank and bracket, said last mentioned means including means providing for extension and contraction thereof in a direction transverse to the movement of said tubular members.

18. In a device of the class described, a heating unit comprising upper and lower tanks connected by tubular members, means for supporting said unit comprising fluid conducting brackets, one of said brackets having a fluid inlet and portions extending laterally therefrom providing means for connecting a tubular element, the latter of which provides means for completing a fluid connection between one of said portions of the bracket and one of said tanks of said unit.

19. In a device of the class described, a heating unit including tanks connected by tubular members, means for supporting said unit comprising fluid conducting brackets, a connection between one of said tanks and one of said brackets, said connection providing means compensating for linear expansion and contraction of said tubular members and including a tubular connection extending between and connecting said tank and one of said brackets, said bracket having an opening through which one end of said tubular connection extends, said opening providing for relative movement of said tank and end of said tubular connection relatively to said bracket.

In witness whereof, I hereunto subscribe my name this 18th day of July A. D., 1929.

ARTHUR B. MODINE.